United States Patent

[11] 3,622,045

| [72] | Inventors | James E. Delaney, Jr.<br>Hatboro;<br>Robert F. Zecher, Huntingdon Valley, Pa.;<br>William T. LaRose, Sr., Troy; John F.<br>Trembley, Loudonville, N.Y. |
|---|---|---|
| [21] | Appl. No. | 818,327 |
| [22] | Filed | Apr. 22, 1969 |
| [45] | Patented | Nov. 23, 1971 |
| [73] | Assignees | Hull Corporation<br>Hatboro, Pa.;<br>W. T. LaRose and Associates Inc.<br>Troy, N.Y., part interest to each |

[54] APPARATUS FOR FEEDING AND PREHEATING PLASTIC MOLDING RESIN IN PARTICULATE FORM
4 Claims, 4 Drawing Figs.

[52] U.S. Cl.................................................. 222/71,
222/146 HE, 222/152
[51] Int. Cl........................................................ B67d 5/16

[50] Field of Search........................................ 222/146 H,
146 HE, 146 R, 71, 334, 152, 53, 333, 306;
18/DIG. 60, 12 SN, 30 GA, 30 GS

[56] References Cited
UNITED STATES PATENTS

| 2,820,577 | 1/1958 | Winters et al................ | 222/306 |
| 3,008,188 | 11/1961 | Harvey......................... | 222/334 X |
| 3,140,018 | 7/1964 | Miller............................ | 222/334 X |
| 3,143,294 | 8/1964 | Lundin et al................. | 222/146 HE X |
| 3,177,527 | 4/1965 | Nelson ........................ | 18/DIG. 60 |

Primary Examiner—Robert B. Reeves
Assistant Examiner—John P. Shannon, Jr.
Attorney—Oliver D. Olson ABSTRACT: Particles of plastic molding resin are metered in predetermined amount from a hopper to a preheat chamber in which a stuffer blade reciprocates to eject the preheated particles to a transfer tube for delivery to a transfer molding press.

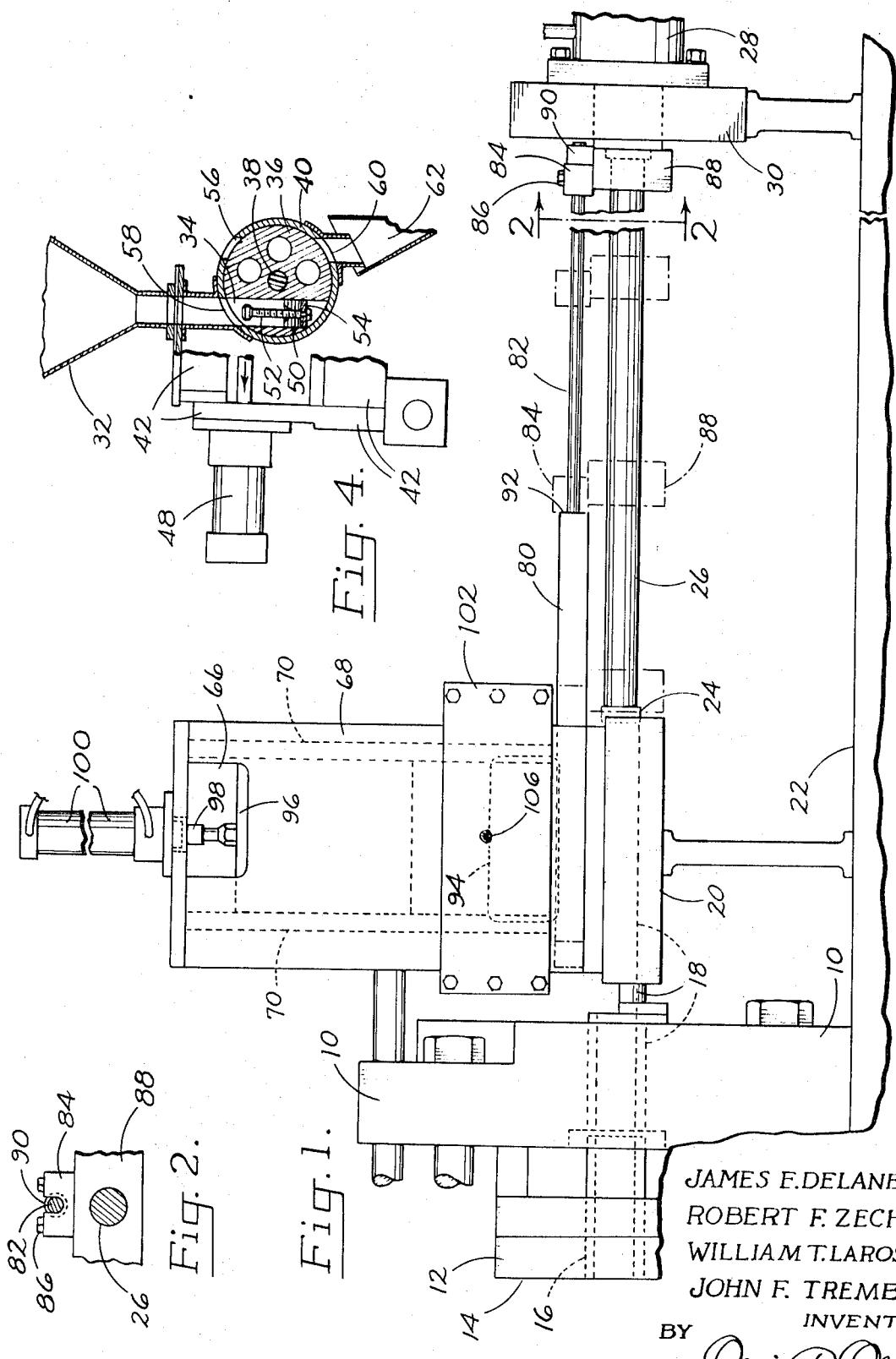

3,622,045

APPARATUS FOR FEEDING AND PREHEATING PLASTIC MOLDING RESIN IN PARTICULATE FORM

BACKGROUND OF THE INVENTION

This invention relates to the molding of synthetic thermosetting and thermoplastic resins, and more particularly to means by which to utilize preheated resin particles as the charge for a transfer molding press. The term "particles" as used herein is intended to include such forms as powders, granules, flakes and pellets as distinguished from conventional preforms.

The technique of transfer molding initially involved the delivery of unheated resin particles or preforms to the mold where heat and pressure were applied to form the finished article. Subsequently it was found that preheating the resin before transfer to the mold had the advantage of decreasing the molding time and correspondingly increasing production. However, the preheating and transfer of powders or other particles of molding resins heretofore has been found to be deficient both as to process efficiency and as to product properties.

Many disadvantages attend the use of preheated preforms. It requires costly preform equipment and plant space for it, as well as personnel to operate and maintain it. It also requires the provision of storage and handling equipment for the preforms. The production of various sizes of preforms, commensurate with the articles to be molded, necessitates adjustments in the preform equipment.

The use of preforms also limits the use of synthetic resins to those that are capable of being preformed, thereby limiting the types of articles capable of being produced by the transfer molding technique. Moreover the production of preforms of uniform density and hardness has not been achieved, and this is reflected in the production of finished articles having inconsistent physical characteristics.

SUMMARY OF THE INVENTION

In its basic concept the present invention provides means by which predetermined amounts of synthetic resin particles may be preheated and then transferred quickly to the press mold.

It is by virtue of the foregoing basic concept that the principal objective of the present invention is achieved, namely to overcome the disadvantages of prior techniques, as enumerated hereinbefore.

Another important object of the present invention is to provide plastic molding particle feeding and preheating apparatus which may be utilized with various types of molding presses, with minimum modification.

The foregoing and other objects and advantages of this invention will appear from the following detailed description, taken in connection with the accompanying drawings of the preferred embodiment.

BRIEF DESCRIPTION OF THE DRAWINGS

FIG. 1 is a fragmentary, foreshortened front elevation of plastic molding particle feeding and preheating apparatus embodying the features of this invention, the same being shown in association with components of a conventional transfer molding press.

FIG. 2 is a fragmentary sectional view taken on the line 2—2 in FIG. 1.

FIG. 4 is a fragmentary sectional view of the storage and metering components of the apparatus.

DESCRIPTION OF THE PREFERRED EMBODIMENT

Figure 3:
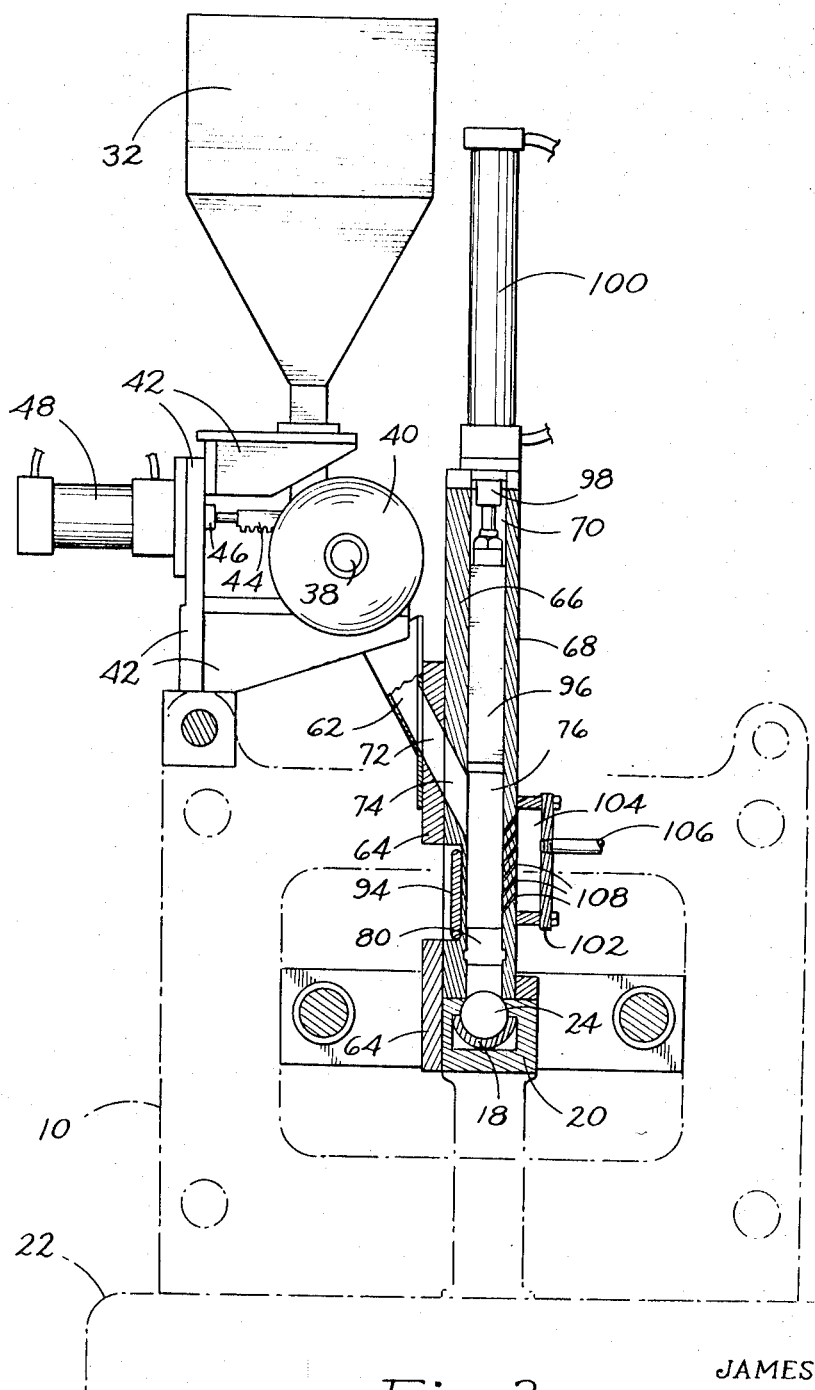
FIG. 3 is an end elevation as viewed from the left in FIG. 1, parts being broken away to disclose details of internal construction.

In FIG. 1 there are shown for purposes of illustration components of a conventional transfer molding press with which the apparatus of the present invention is shown to be incorporated. Thus, there is illustrated one section 10 of a press platen upon which the corresponding transfer mold half 12 is mounted. The surface 14 of the mold section defines the parting line of the mold. Molding material is delivered to the transfer port 16 of the mold assembly by means of the elongated, hollow guide member 18 supported at one end by section 10 and at the other end by the block 20. The block is supported by a post projecting from the press frame 22. A transfer ram head 24 in the guide member is secured to the front end of an elongated piston rod 26 the opposite end of which is secured to a piston (not shown) reciprocative in an elongated fluid pressure cylinder 28. The cylinder is supported on the press frame 22 by the frame member 30.

Thus, by suitable application of fluid pressure selectively to the opposite ends of the cylinder 28 the transfer ram head 24 is reciprocated along the length of the guide member 18 between the retracted position illustrated in FIG. 1, a spaced distance outward of the mold section, and an extended position into the transfer pot 16 of the mold for introducing molding material into the mold.

In accordance with the present invention means is provided for preheating predetermined quantities of plastic molding particles and, in the embodiment illustrated, to deliver the preheated particles to the guide member 18 for transfer to the mold. Thus, there is provided a storage hopper 32 adapted to contain unheated plastic molding particles. The bottom end of the hopper is provided with a constricted outlet (FIG. 4) which registers with means for metering predetermined quantities of particles from the hopper. In the embodiment illustrated (FIG. 4) the metering means includes a volumetrically adjustable chamber 34 formed in the rotary drum 36. The drum is secured for rotation with shaft 38 journaled in bearings on end plates of the cylindrical drum housing 40. The housing is supported by framework 42 carried by section 10 of the press platen.

Drive means for rotating the shaft 38 comprises a gear (not shown) on the shaft meshing with rack 44 secured to the projecting end of the piston rod 46 of the hydraulic cylinder 48. Reciprocation of the piston rod thus effects rotation of drum 36 through 180°, between the chamber-charging position illustrated in FIG. 4 and a discharge position described hereinafter.

The volumetrically adjustable chamber 34 is provided with a bottom block 50 which is movable longitudinally in the chamber. A threaded central opening in the block receives the threaded adjustment screw 52. The screw is anchored at its bottom end in a plate 54 which permits axial rotation of the screw but prevents longitudinal movement of it. Thus, by rotating the screw the block may be adjusted longitudinally of the chamber to vary the volume of the latter.

A screwdriver slot is provided in the bottom end of the screw for rotating the latter. This screwdriver slot is accessible through the opening 56 in the housing 40 when the drum is rotated 180° from the position illustrated in FIG. 4.

The drum housing has a top inlet opening 58 registering with the constricted outlet of the hopper 32. Diagonally opposite the inlet opening is a bottom outlet opening 60 registering with the upper end of the discharge chute 62. The chute is secured to the mounting plate 64 (FIG. 3) which, in turn, is secured to the block 20.

Secured to the mounting plate 64 and block 20 is an elongated hollow housing which, in the embodiment illustrated, is of rectangular configuration, being defined by the sidewalls 66 and 68 and end walls 70.

The lower end of the discharge chute 62 has an opening registering with an opening 72 in the mounting plate. The wall 66 of the housing also is provided with an inlet opening 74 registering with the opening in the mounting plate. This opening communicates with the interior of the housing, which interior defines a preheating chamber 76 into which a metered quantity of molding particles is deposited from the chute.

The open lower end of the preheat chamber registers with the open upper side of the hollow guide member 18 between the press platen section 10 and the retracted position of the ram head 24. This open lower end of the housing is removably closed by a gate member 80 which is mounted in the housing for reciprocation between an extended position closing said open bottom end and a retracted position opening said bottom end for communication of a preheat chamber with the hollow guide member.

In the embodiment illustrated the gate member 80 is connected operatively to the piston rod 26 of the transfer ram for reciprocation by the latter. Thus, an elongated rod 82 is connected to the gate member and extends parallel to the piston rod 26 slidably through a groove in the abutment block 84. This block is secured, as by the bolts 86, to the piston rod guide block 88 secured to the piston rod 26. The end of the rod extending through the abutment block is provided with an enlarged head, in the form of the removable collar 90. Thus, during reciprocation of the piston rod 26 the abutment block 84 slides freely along the rod 82 between the limits defined by the collar 90 and the shoulder 92 formed between the rod 82 and gate member 80. Further movement of the piston rod effects simultaneous movement of the gate member in the corresponding direction, as explained more fully hereinafter.

Between the inlet opening 74 and the gate member 80 the housing supports a heater member 94 which is removable through the opening in the mounting plate 64. Although various types of heaters may be employed for preheating the plastic molding particles, it is preferred to use a very high-frequency preheater. Typical of various electronic heaters commercially available is the model No. PPTH-7-1/2KW manufactured by W. T. LaRose and Associates, Troy, New York.

Also contained within the preheater chamber 76 is a reciprocative ejector member for moving the preheated particles from the preheat chamber to the guide member 18 when the gate member 80 is retracted. In the embodiment illustrated, the ejector means comprises a piston member in the form of a stuffer blade 96 confined slidably in the housing for reciprocation between the illustrated retracted position upward from the inlet opening 74 and an extended position downward adjacent the lower open end of the housing. The stuffer blade is connected to the projecting end of the piston rod 98 the opposite end of which is secured to a piston reciprocative in the fluid pressure cylinder 100.

Means also is provided for removing gases and other volatile materials from the preheat chamber and from the molding particles contained therein. In the embodiment illustrated, such means comprises a vacuum housing 102 secured to the sidewall 68 of the preheater housing opposite the heater member 94. The vacuum housing forms with said sidewall 68 an enclosed vacuum chamber 104 which communicates through the conduit 106 with a vacuum pump or other source of vacuum. A plurality of tiny openings 108 in a preheater housing wall 68 communicate the preheater chamber 76 with the vacuum chamber 104. These openings thus accommodate evacuation of the preheater chamber, but are sufficiently small to prevent removal of the molding particles therethrough. The operation of the apparatus described hereinbefore is as follows: The cycle of operation is initiated with the transfer ram head 24 extended into the transfer pot 16. In this position the abutment block 84 has engaged the shoulder 92 and extended the gate member 80 across the open bottom end of the preheater chamber 76 to close the latter. With the chamber 34 prefilled with molding particles from the hopper, the metering cylinder 48 then is actuated to retract its piston rod 46 and rotate the chamber counterclockwise from the charging position illustrated in FIG. 4. The chamber thus is brought into registry with the outlet opening 60 in the housing. The contents of the metering chamber thereupon gravitates downward through the chute 62 and into the preheating chamber 76. It is to be understood that the stuffer blade 96 in its retracted position illustrated in FIG. 3.

The stuffer cylinder 100 then is actuated to move the stuffer blade downward to close opening 74. If desired, the stuffer blade may be extended downward still further to compact the particles to a slight degree. This further extension of the stuffer blade is not essential, however, and may be omitted. The heater 94 then is energized and the source of vacuum is connected to the vacuum chamber 104, by a suitable control valve not shown.

After the heater has been energized for a predetermined period of time, it may be deenergized. The stuffer blade then is retracted, if it had been extended, and the transfer ram head 24 also is retracted fully to the position illustrated in FIG. 1. In retracting to this position the abutment block 84 engages the collar 90 and moves the gate member 80 to the retracted position illustrated in FIG. 1. The distance between the collar 90 and shoulder 92 accommodates movement of the ram head 24 through a distance which is longer than the distance of movement of the gate member 80.

At this stage the resin particles have been heated substantially to the molding temperature, i.e. the curing temperature to which thermosetting resins are subjected in the mold or the maximum softening temperature at which thermoplastic resins may be transferred to the mold. At this temperature the resin still may be in the form of discrete particles, or it may form a coherent mass which is relatively soft but not sufficiently fluid as to flow. The stuffer cylinder 100 then is operated to extend its piston rod and move the stuffer blade downward to eject the preheated particles of molding resin into the guide tube 18. The stuffer blade then is retracted and the transfer ram cylinder 28 is activated quickly to move the preheated mass through the guide tube and into the transfer pot 16 of the press mold.

During the curing time of the resin in the mold, a second metered charge of molding particles is delivered to the preheat chamber 76, to begin the next subsequent cycle of operation.

It will be understood that the sequential operation of the fluid pressure cylinders, heater member and vacuum control valve may be effected automatically by use of appropriate timer mechanism. For example, electrically actuated solenoid valves may be used in the conduits of the cylinders and vacuum supply, and an electric relay may be used to control the heater, and a conventional electric timer switch assembly may be used to activate the solenoids and relay on a predetermined time sequence.

It will be apparent to those skilled in the art that various other changes in the size, shape, number and arrangement of parts described hereinbefore may be made without departing from the spirit of this invention.

Having now described our invention and the manner in which it may be used, we claim:

1. Apparatus for preheating separate predetermined charges of plastic molding particles and feeding same to infeed mechanism of a plastic molding press, comprising
   a. a hollow housing defining a plastic charge preheat chamber having an open bottom end adapted to register with the infeed mechanism of a plastic molding press,
   b. gate means adjacent the open bottom end of the housing movable between a position closing said open end for confining a charge of plastic molding particles in the chamber for preheating, and a position opening said open end for feeding the preheated charge to said infeed mechanism,
   c. heater means above the bottom of the housing for preheating a charge of plastic molding particles in the chamber,
   d. ejector means movable through the preheat chamber between an upper retracted position and a downward extended position for moving a preheated charge of plastic molding particles from the chamber through said open end to said infeed mechanism when the gate means is in open position, and
   e. particle delivery means communicating with the housing below the upper retracted position of the ejector means for charging the chamber with a predetermined quantity of plastic molding particles to be preheated.

2. The apparatus of claim 1, wherein the ejector means comprises a piston member reciprocative in the preheat chamber relative to the open end of the latter.

3. The apparatus of claim 1, wherein the particle delivery means includes particle storage means having an outlet, and adjustable metering means adjacent said outlet for delivering a predetermined quantity of plastic molding particles to the preheat chamber.

4. The apparatus of claim 1, including evacuating means communicating with the preheat chamber for removing gases and volatile materials from the chamber and plastic particles contained therein.

* * * * *